United States Patent
Chen et al.

(10) Patent No.: US 11,099,603 B2
(45) Date of Patent: Aug. 24, 2021

(54) VARIABLE TORQUE BARS

(71) Applicant: Hewlett-Packard Development Company, L.P., Spring, TX (US)

(72) Inventors: Wei-Chung Chen, Taipei (TW); Kuan-Ting Wu, Taipei (TW); Kun-Hung Lin, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/767,540

(22) PCT Filed: Nov. 30, 2017

(86) PCT No.: PCT/US2017/063904
§ 371 (c)(1),
(2) Date: May 27, 2020

(87) PCT Pub. No.: WO2019/108191
PCT Pub. Date: Jun. 6, 2019

(65) Prior Publication Data
US 2021/0173436 A1    Jun. 10, 2021

(51) Int. Cl.
*G06F 1/16* (2006.01)
(52) U.S. Cl.
CPC .......... *G06F 1/1616* (2013.01); *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 7,984,532 B2* | 7/2011 | Huang | ............... | G06F 1/1681 16/342 |
| 9,292,049 B1* | 3/2016 | Woodhull | ............ | G06F 1/1681 |
| 9,778,703 B2 | 10/2017 | Senatori et al. | | |
| 9,857,833 B2* | 1/2018 | Morrison | ............. | G06F 1/1616 |
| 10,234,905 B2* | 3/2019 | Chen | .................... | G06F 1/1681 |
| 10,585,459 B2* | 3/2020 | Chen | .................... | G06F 1/1656 |
| 10,871,803 B2* | 12/2020 | Wu | ....................... | G06F 1/1681 |
| 2006/0081757 A1 | 4/2006 | Okahara | | |
| 2007/0001076 A1 | 1/2007 | Asamarai | | |

(Continued)

FOREIGN PATENT DOCUMENTS

| CN | 1311402 | 9/2001 |
|---|---|---|
| CN | 1831705 A | 9/2006 |

(Continued)

OTHER PUBLICATIONS

Worthen, B., Windows 8 Success Hinges on $10 Component, Oct 26, 2012, https://www.wsj.com/articles/SB10001424052970204005004578080621686676956.

*Primary Examiner* — Lisa Lea-Edmonds
(74) *Attorney, Agent, or Firm* — Brooks Cameron & Huebsch PLLC

(57) ABSTRACT

Examples herein relate to an apparatus. In some examples, an apparatus can include a first bracket connected to a first shaft, a second bracket connected to the first bracket, a variable torque bar connected to the first bracket and to a second shaft. The variable torque bar includes a plurality of notches to engage a tensioner mechanism and alter an amount of torque applied to the first shaft when the tensioner mechanism engages the respective notches of the plurality of notches.

15 Claims, 6 Drawing Sheets

(56) References Cited

U.S. PATENT DOCUMENTS

| | | |
|---|---|---|
| 2008/0134467 A1 | 6/2008 | Cheng et al. |
| 2010/0051761 A1 | 3/2010 | Wang |
| 2012/0187056 A1 | 7/2012 | Hazzard |
| 2013/0200240 A1 | 8/2013 | Lindblad |
| 2017/0003719 A1 | 1/2017 | Siddiqui |
| 2020/0026333 A1* | 1/2020 | Wu .......................... E05D 7/00 |
| 2020/0183463 A1* | 6/2020 | Chen ...................... E05D 3/122 |
| 2020/0241602 A1* | 7/2020 | Ku ......................... E05D 11/08 |
| 2020/0278723 A1* | 9/2020 | Chen .................... G06F 1/1681 |
| 2020/0281084 A1* | 9/2020 | Chen ................... E05D 11/105 |

FOREIGN PATENT DOCUMENTS

| | | |
|---|---|---|
| CN | 201944105 U | 8/2011 |
| CN | 105549688 | 5/2016 |
| CN | 107153445 | 9/2017 |
| JP | 2011022834 | 2/2011 |
| WO | WO-2012015821 | 2/2012 |

\* cited by examiner

VARIABLE TORQUE BARS

BACKGROUND

Electronic devices may include a display. A display can present images, text, and/or video to a user. The electronic device may include an apparatus to alter a viewing angle of the display.

DETAILED DESCRIPTION

Figure 1A:
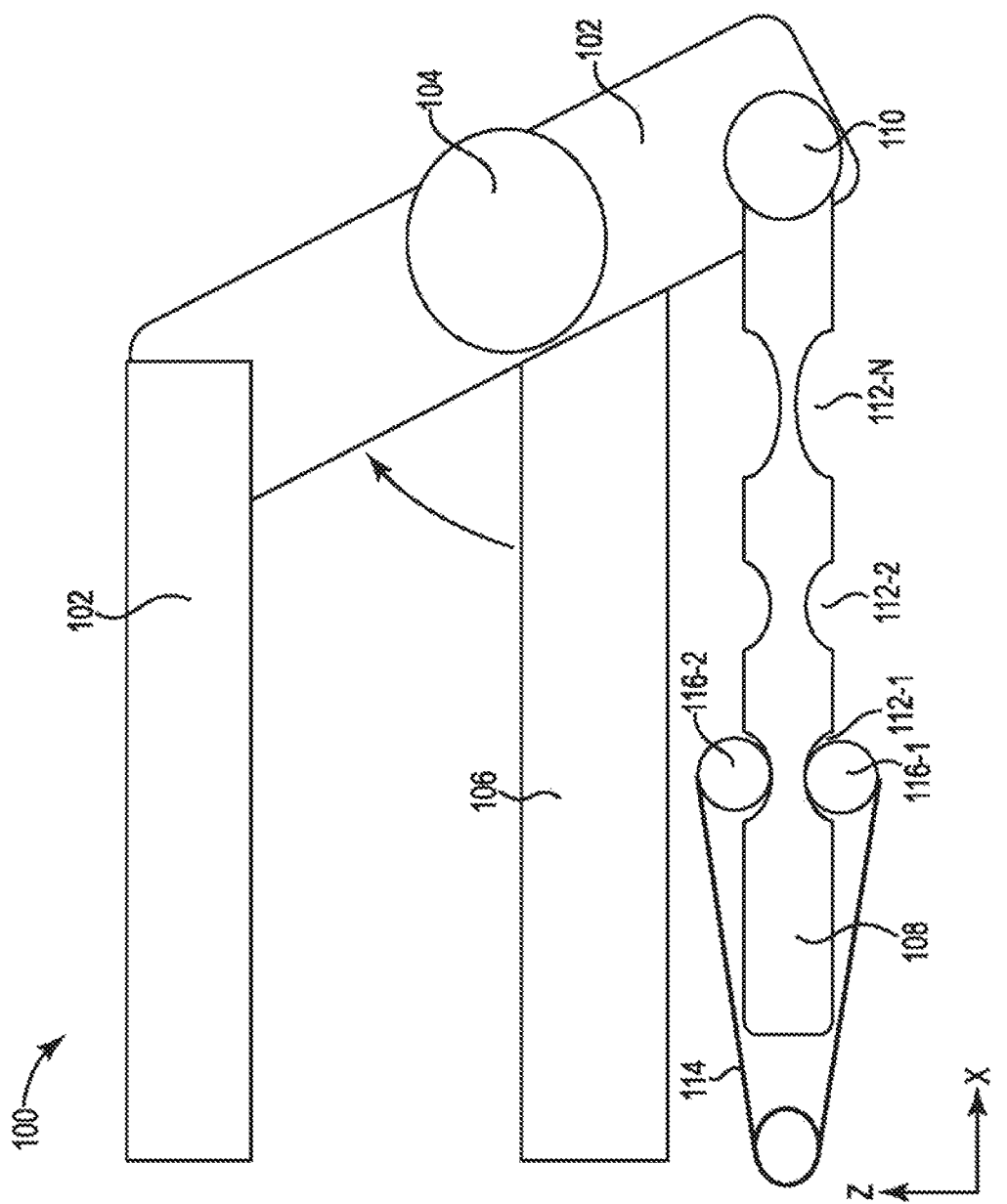
FIG. 1A illustrates a side view of an example of an apparatus consistent with the disclosure.

Electronic devices such as laptops, phablets, convertibles, and other types of computing devices may include a display. An electronic device may include rotatable components to view the display at various angles. As used herein, the term "display" can, for example, refer to a device which can provide information to a user and/or receive information from a user. For example, a display can include a graphical user interface (GUI) that can provide and/or receive information to and/or from a user.

Electronic devices may include rotatable components such as a rotatable display, which may also include a hinge. For example, facilitating rotation of the rotatable components to allow the display to be viewed at various angles can be accomplished by a hinge. As used herein, the term "hinge" can, for example, refer to a mechanical connection that connects two objects such that the two objects can rotate relative to each other by an angle of rotation about a fixed axis of rotation. For example, a display of a computing device can be rotated such that the display may be viewed at various angles.

In some approaches, devices including touch screen displays may experience a force in response to a user input to the display. For example, a user may touch the display in order to provide an input to the computing device, and the display may experience a force as a result of the user touching the display. The display may rotate by an angle of rotation as a result of the user touching the display. In some examples, the rotation of the display as a result of the user touching the display can cause the display to rotate to an angle at which a user may not wish. Therefore, a user may have to rotate the display back to an angle at which the user wishes. In some examples, in order to prevent the display from rotating, a user may not touch the display with force to cause the input to the display to be received by the display, resulting in the display not receiving the input.

In contrast, examples herein allow for a variable torque bar which may allow for varying torque to be applied to the display to resist the force applied to the display by a user. In some examples, this may allow for the display to maintain a desired angle when a user interacts with the display and/or may mitigate damage to the display that may be incurred if the display is allowed to rotate to angles greater than a particular threshold angle.

The disclosure is directed to an apparatus. In some examples the apparatus may include a hinge. The apparatus may include a variable torque bar, which can provide varying torque as the apparatus is operated. In various examples according to the disclosure, the apparatus having variable torque can resist rotation when a user touches a display. By resisting rotation, the apparatus can maintain an angle at which a user wishes. In some examples, the variable torque can be weaker when the user is opening the computing device to view the display such that the user may open the computing device with one hand. In other examples, the variable torque may increase as the angle between the display and the housing of a computing device increases, this may prevent the display from experiencing touch force that may be damaging to the computing device. The term "touch force" as used herein is referring to the amount of force applied to move the display of a computing device and/or apply input to a computing device through physical touch.

Figure 1B:
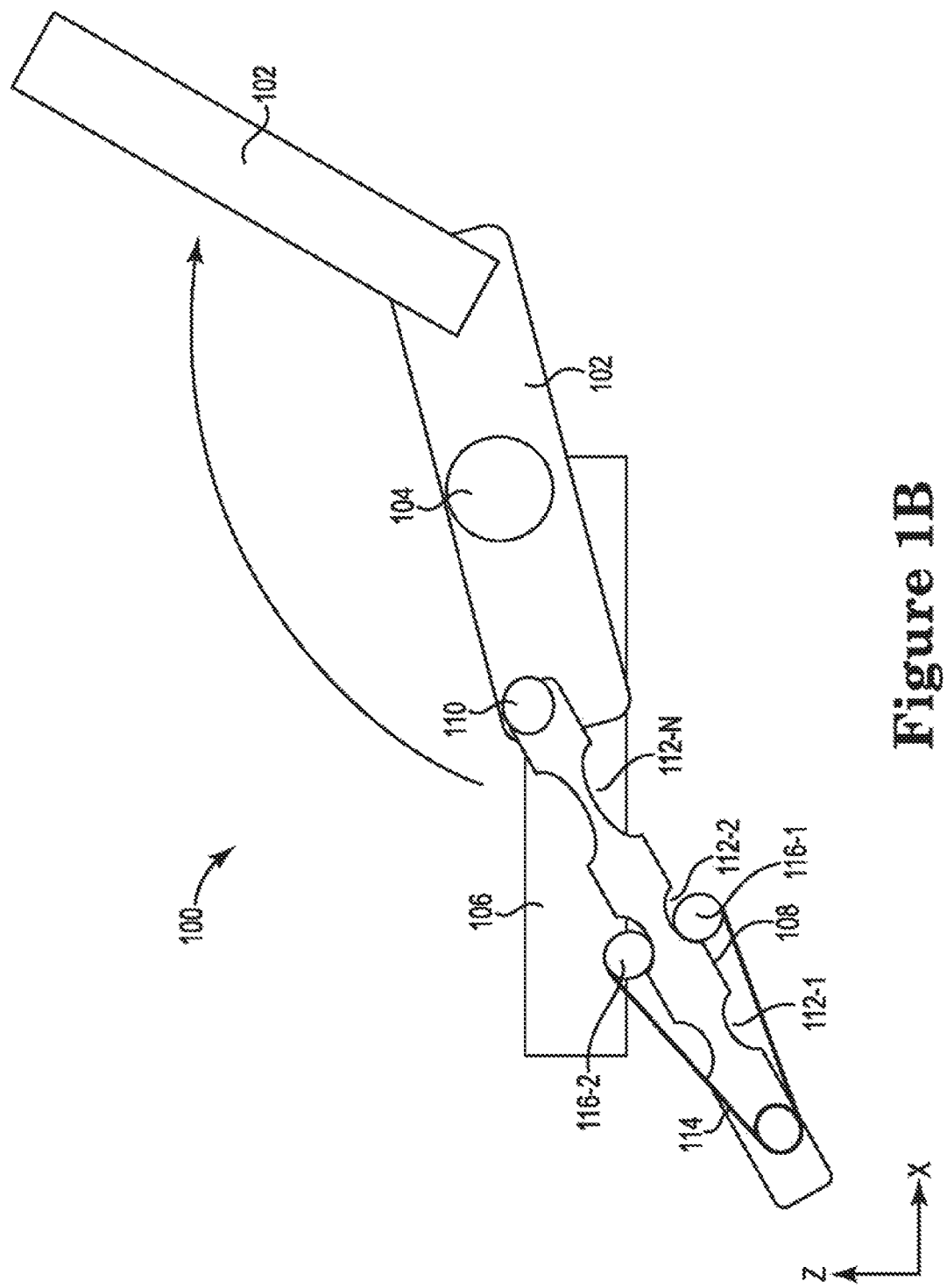
FIG. 1B illustrates another side view of an example of an apparatus consistent with the disclosure.
Figure 1C:
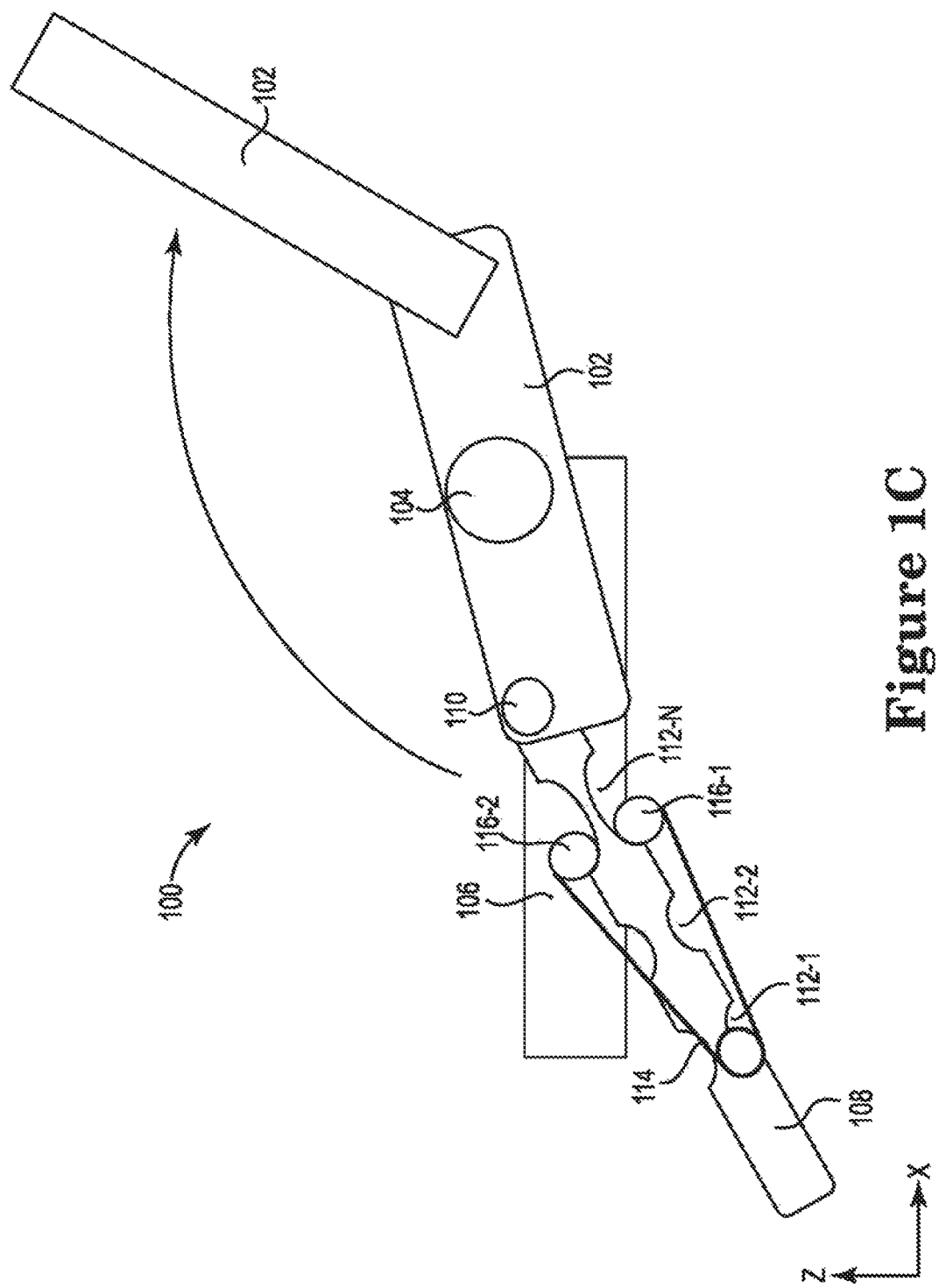
FIG. 1C illustrates yet another side view of an example of an apparatus consistent with the disclosure.

FIG. 1A, FIG. 1B, and FIG. 1C illustrate side views of an example apparatus 100 consistent with the disclosure. The apparatus 100 can include a first bracket 102, a first shaft 104, a second bracket 106, a variable torque bar 108, a second shaft 110, a plurality of notches 112-1 . . . 112-N, and a tensioner mechanism 114. While FIGS. 1A, 1B and 1C are illustrated having three notches 112-1, 112-2 . . . 112-N, it should be understood that the variable torque bar 108 may have more or less than three notches.

As illustrated in FIGS. 1A, 1B, and 1C, the apparatus 100 can be oriented in an x-z-coordinate plane. For example, the x-coordinate as shown in FIGS. 1A, 1B, and 1C can be a length and the z-coordinate as shown in FIGS. 1A, 1B and 1C can be a height. As indicated by the coordinate plane shown in FIGS. 1A, 1B, and 1C a positive x-direction can refer to a direction toward the right of the page, and a positive z-direction can refer to a direction toward the top of the page. A negative x-direction can refer to a direction toward the left of the page, and a negative z-direction can refer to a direction toward the bottom of the page.

As illustrated in FIG. 1A, the apparatus 100 illustrates an apparatus at a first angle of rotation. As illustrated in FIG. 1B the apparatus 100 illustrates the apparatus at a second angle of rotation. As illustrated in FIG. 1C the apparatus 100 illustrates the apparatus at a third angle of rotation. The apparatus 100 rotates from the first angle of rotation illustrated in FIG. 1A, to the second angle of rotation illustrated in FIG. 1B, to a third angle of rotation illustrated in FIG. 1C, about first shaft 104 in a clockwise direction as indicated in FIGS. 1A, 1B and 1C. As used herein, the term(s) "angle of rotation" and/or "rotation angle" refer to an angle formed by two reference rays where the reference rays share a common endpoint, and the movement of the reference rays about a longitudinal axis change the figure.

The apparatus 100 can include a first bracket 102. As used herein, the term "bracket" can, for example, refer to a support object to connect to and/or support a different object. The first bracket 102 can be connected to first shaft 104. As used herein, the term "shaft" can, for example, refer to a substantially cylindrical object such as a pole or other structural member. The first bracket 102 can be connected to a rotating element of a computing device, such as a display of a computing device, as is further described in connection with FIG. 4, herein.

The apparatus 100 can include a second bracket 106. The second bracket 106 can be connected to the first bracket 102. The second bracket 106 can remain immobile when first bracket 102 and first shaft 104 are rotated. For example, first bracket 102 and first shaft 104 can rotate relative to second bracket 106. The second bracket 106 can be connected to a housing of a computing device, as is further described in connection with FIG. 4, herein.

The apparatus 100 can include a variable torque bar 108 attached to first bracket 102 via a second shaft 110. As used herein, the term "variable torque bar" can, for example, refer to a bar to alter an amount of torque applied as the bar is actuated by an apparatus, machine, and/or device, and the term "bar" as used herein, is a mechanical and/or structural member. The variable torque bar 108 can be a bar that is of a shape to allow for variable torque to be applied to the first bracket 102 as the first bracket 102 increases an angle relative to the second bracket 106. For example, as illustrated in FIGS. 1A, 1B, and 1C variable torque bar 108 can move in a substantially negative x-direction in response to the movement of first bracket 102 in a substantially positive z-direction. The substantially negative z-direction may also be substantially orthogonal to the first longitudinal axis of the first shaft. The second shaft 110 can rotate about a second longitudinal axis in response to the movement of the first bracket 102 as described above.

As used herein, the term "substantially" may be absolute, or may intend that the characteristic is not always absolute, but is close enough so as to achieve the outcome of the characteristic. For example, "substantially orthogonal" is not limited to absolute orthogonality, and can include orientations that are intended to be orthogonal but due to manufacturing limitations may not be precisely orthogonal. For example, "substantially negative direction" features are at least closer to a negative direction orientation than a positive direction orientation. Similarly, "substantially positive direction" features are at least closer to a positive direction orientation than a negative direction orientation.

In some examples, variable torque bar 108 may be tapered, asymmetrical, and/or of a uniform shape and diameter. For example, the variable torque bar may be of varying widths and may be extendable. In some examples, as described further below, variable torque bar 108 may have notches, divots, and/or depressions corresponding to particular angles formed from the first bracket 102 relative to second bracket 106.

The variable torque bar 108 may include notches 112-1 . . . 112-N. As used herein, the term "notch" can, for example, refer to a portion of variable torque bar 108 that may be formed of the variable torque bar 108, and/or may be an attachment to variable torque bar 108. The notch(s) may correspond to a number of angles formed by the first bracket 102 relative to the second bracket 106. The notches 112-1 . . . 112-N, may be of varying size and/or diameter, to facilitate the application of the varying torque as a result of the increasing or decreasing angle between the first bracket 102 and the second bracket 106. Although FIGS. 1A, 1B, and 1C are illustrated with notches having the same particular shape and size it should be understood that examples are not so limited. For example, while FIGS. 1A, 1B, and 1C are illustrated having three notches, it should be understood that variable torque bar 108 may have more or less than three notches, and/or the notches may differ in size and shape. For example, notch 112-1 may have the same or different width and/or shape as notch 112-N.

The apparatus 100 can include tensioner mechanism 114. As used herein, the term "tensioner mechanism" refers to a member that applies a pressure and/or a resistance to a structural member. For example, tensioner mechanism 114 may be a variety of spring. In some examples, tensioner mechanism 114 may be a torsion spring, although examples are not so limited. In some examples, the tensioner mechanism may apply a pressure and/or resistance to a structural member such as variable torque bar 108. In the example shown in FIGS. 1A, 1B, and 1C tensioner mechanism 114 is a spring that operates by torsion and/or twisting of a coil about an axis that is substantially the same as the second longitudinal axis of second shaft 110. The term "coil" as used herein can refer to a piece of the spring that is manipulated into a substantially helical arrangement.

In the examples illustrated in FIGS. 1A, 1B, and 1C, the tensioner mechanism 114 may have a pair of torque engaged pins 116-1, 116-2 that cause twisting/torsion of the coil as the pair of torque engaged pins 116-1, 116-2 are separated from one another. Said differently, as the pair of torque engaged pins 116-1, 116-2 of tensioner mechanism 114 are forced away from each other in the z-plane, the coil opposite the pair of torque engaged pins 116-1, 116-2 twists thereby applying increased force in the form of torque to the variable torque bar 108, and the first bracket 102.

In some examples, torsion mechanism 114 may be anchored at the end opposite the pair of torque engaged pins 116-1, 116-2. As used herein, the term "anchor" refers to a portion may be moveably and/or removably fastened to a portion of a structural member. For example, the spring portion opposite the pair of torque engaged pins 116-1, 116-2 may be anchored such that the tensioner mechanism 114 is substantially stationary about the x-plane, but the pair of torque engaged pins 116-1, 116-2 may freely move in the z-plane.

The pair of torque engaged pins 116-1, 116-2 may substantially correspond to notches 112-1 . . . 112-N, thereby slightly releasing the pressure/resistance experienced by tensioner mechanism 114 by way of allowing the pair of torque engaged pins 116-1, 116-2 to move closer to one another when located at a notch 112-1 . . . 112-N. For example, variable torque bar 108 may move in a substantially negative x-direction in response to alter an angle between the first bracket 102 and the second bracket 106. As variable torque bar 108 moves in the negative x-direction, tensioner mechanism 114 may experience tension in the form of torque about its coil in response to the pair of torque engaged pins 116-1, 116-2 separating from one another to accommodate the movement of the variable torque bar 108, this movement increases torque as the pair of torque engaged pins 116-1, 116-2 are moved from notch 112-1 toward notch 112-2 illustrated in FIGS. 1A and 1B.

In some examples, notches 112-1 . . . , 112-N engage the tensioner mechanism 114 in various positions corresponding to particular angles achieved by the first bracket 102 in relation to the second bracket 106. For example, as illustrated in FIG. 1A, notch 112-1 may correspond to a 0-degree angle between bracket 102 and 106. Said differently, notch 112-1 may correspond to first bracket 102 and second bracket 106 having an angle of about 0-degrees therebetween, as illustrated in FIG. 1A. As used herein, the term "about" when referring to degrees of an angle means plus or minus 10-degrees. For example, first bracket 102 may be connected to a display of a computing device such as a laptop, and second bracket 106 may be connected to a housing of the computing device, and when the computing device is closed the angle between the display and the housing is about 0-degrees.

As illustrated in FIG. 1A, the apparatus 100 is in a first position corresponding to about a 0-degree angle between first bracket 102 and second bracket 106. As illustrated in FIG. 1I, apparatus 100 is illustrated in a second position corresponding to about 90-degrees. As illustrated in FIG. 1B, the variable torque bar 108 can move relative to tensioner mechanism 114 to a second position at notch 112-2 as second shaft 110 rotates about a second longitudinal axis of second shaft 110 corresponding to the rotation about the first longitudinal axis of first shaft 104 in response to the angle between first bracket 102 and second bracket 106 increasing. For example, as illustrated in FIG. 1A, first bracket 102 and first shaft 104 can rotate to cause second shaft 110 to rotate causing variable torque bar 108 to move in a translational motion in a negative x-direction. The variable torque bar 108 can translate to a second position, as shown in FIG. 1B as the pair of torque engaged pins 116-1, 116-2 of tensioner mechanism 114 reach notch 112-2 of variable torque bar 108.

The first bracket 102 and first shaft 104 can rotate relative to second bracket 106 about a first longitudinal axis of first shaft 104. For example, as illustrated in FIG. 1A, first bracket 102 and first shaft 104 can rotate from a first rotation angle, to a second rotation angle as illustrated in FIG. 1B by first bracket 102 and first shaft 104. The second bracket 106 can stay in the same position as first bracket 102 and first shaft 104 rotates, as illustrated in FIGS. 1A and 1B As illustrated in FIGS. 1A, 1B, and 1C the variable torque bar 108 can move in a substantially orthogonal direction, e.g. negative x-direction, relative to the first longitudinal axis of the first shaft 104. In some examples, variable torque bar 108 may also tilt in the positive z-direction. For example, as illustrated in FIG. 1B, the end of variable torque bar 108 closest to second shaft 110 can tilt in a positive z-direction as the angle between 102 and 106 increases.

As described above, a variable torque force may be generated between the variable torque bar 108 and the tensioner mechanism 114. For example, as illustrated in FIG. 1A, a first torque force may be generated between the variable torque bar 108 and the tensioner mechanism 114 when variable torque bar 108 is at the first position e.g. when the pair of torque engaged pins are at notch 112-1. As illustrated in FIG. 1, responsive to first bracket 102 and first shaft 104 rotating, variable torque bar 108 may move to a second position relative to tensioner mechanism 114, e.g. when the pair of torque engaged pins are at notch 112-2.

In some examples, the variable torque force may be greater at the second position e.g. when notch 112-2 is engaged, than at the first position e.g. when notch 112-1 is engaged. For example, as illustrated in FIG. 1B, the torque force generated between the variable torque bar 108 and the tensioner mechanism 114 (e.g., when the variable torque bar 108 is at the second position) can be greater than the torque force generated between the variable torque bar 108 and the tensioner mechanism 114 (e.g., when the variable torque bar 108 is at the first position), as illustrated in FIG. 1A. In some examples, this may allow for easier operability by a user.

For example, as illustrated in FIG. 1A, when first bracket 102 is connected to a display of a computing device such as a laptop, and second bracket 106 may be connected to a housing of the computing device, notch 112-1 corresponds to a first position at about a 0-degree angle when the display of the computing device is closed. In some examples, as illustrated in FIG. 1B variable torque bar 108 can move to a second position as described above, however the torque force from the first position to the second position is such that a user may open the computing device with ease. In some examples, the weaker torque force exerted from the first position illustrated in FIG. 1A, to the second position illustrated in FIG. 1B, may permit the user to open the computing device using one hand.

In comparison, some approaches may utilize two hands, or another mechanism, to open a computing device. For example, a user may utilize both hands, one to hold the housing of a computing device immobile while the other hand grips the display and opens the computing device to a desired viewing angle. In another example, the user may utilize another mechanism to hold the housing of a computing device immobile while opening the display.

In response to the torque force being greater at the second position, illustrated in FIG. 1B, than the first position illustrated in FIG. 1A, a greater force may be used in order to create an amount of torque to rotate the first bracket 102 illustrated in FIG. 1B than is used in order to rotate first bracket 102 illustrated in FIG. 1A. For example, the first rotation angle illustrated in FIG. 1A can be about 0-degrees, as illustrated in first bracket 102 in relation to second bracket 106. As illustrated in FIG. 1, the second rotation angle can be about 90-degrees between first bracket 102 relative to second bracket 106. A greater force can be used at the second rotation angle in order to cause first bracket 102 to rotate, than a force used at the first rotation angle to cause first bracket 102 to rotate as a result of the greater torque force at the second position of variable torque bar 108 than the first position of variable torque bar 108.

In some examples, the greater torque force can resist a display of a computing device from rotating when a user touches the display. Resisting the rotation of the display by apparatus 100 can allow for the display to remain at a particular angle while inputs are being provided to the display via a physical touch. For example, if a user is applying input to a computing device utilizing a touch screen feature, the user inputting though touch may not move the display from the desired angle because of the greater torque force at the second position.

In another example, FIG. 1C illustrates apparatus 100 at a third position corresponding to a third angle of rotation. The first and second angles of rotation were discussed above in FIGS. 1A and 1B. The apparatus 100 rotates from the first and/or second angle of rotation discussed above in FIGS. 1A and 1B to the third angle of rotation about first shaft 104 in a clockwise direction as indicated in FIG. 1C.

In some examples, notches 112-1 . . . 112-N may engage the tensioner mechanism 114 in various positions corresponding to particular angles achieved by the first bracket 102 in relation to the second bracket 106. For example, notch 112-1 may correspond to about a 0-degree angle as illustrated in FIG. 1A. Said differently, notch 112-1 may correspond to first bracket 102 and second bracket 106 having an angle of about 0-degrees. In another example, notch 112-2 may correspond to first bracket 102 and second bracket 106 having an angle of about 90-degrees, as illustrated above in FIG. 1B. In another example illustrated in FIG. 1C notch 112-N may correspond to about a 135-degree angle between first bracket 102 and second bracket 106.

As illustrated in FIG. 1C, the apparatus 100 is illustrated in a third position corresponding to an angle between first bracket 102 and second bracket 106 of about 135-degrees. The variable torque bar 108 can move relative to tensioner mechanism 114 to a third position as the pair of torque engaged pins 116-1, 116-2 move to notch 112-N in response to variable torque bar 108 rotating about a second longitudinal axis of second shaft 110 corresponding to the rotation about the first longitudinal axis of first shaft 104 in response to the angle between first bracket 102 and second bracket 106 increasing. For example, second shaft 110 rotates in response to first bracket 102 and first shaft 104 rotates to cause causing variable torque bar 108 to move in a translational motion in a substantially negative x-direction. The variable torque bar 108 can translate to a third position, as shown in FIG. 1C as the pair of torque engaged pins 116-1, 116-2 of tensioner mechanism 114 reaches notch 112-N, of variable torque bar 108.

As illustrated in FIG. 1C, the variable torque force may be greater at the third position than the second position illustrated in FIG. 1B and/or the first position illustrated in FIG. 1A. For example, as illustrated in FIG. 1C, the torque force generated between the variable torque bar 108 and the tensioner mechanism 114 (e.g., when the variable torque bar 108 is at the third position, as illustrated in FIG. 1C) can be greater than the torque force generated between the variable torque bar 108 and the tensioner mechanism 114 (e.g., when the variable torque bar 108 is at the first position, as illustrated in FIG. 1A).

In some examples, this may allow for convenient operability by a user. For example, when first bracket 102 is connected to a display of a computing device such as a laptop, and second bracket 106 may be connected to a housing of the computing device, notch 112-1 corresponds to a first position at about a 0-degree angle when the display of the computing device is closed, as illustrated in FIG. 1A. As variable torque bar 108 moves to a second position (as illustrated in FIG. 1B), or third position as described above in conjunction with FIG. 1C, the torque increases. However, the torque force from the first position (illustrated in FIG. 1A) to the second position (illustrated in FIG. 1B) is such that a user may open the computing device with ease. In some examples, the weaker torque force from the first position to the second position may permit the user to open the computing device using one hand.

In contrast, as a result of the torque force being greater at the third position than the first position illustrated in FIG. 1A, or second position illustrated in FIG. 1B, a greater touch force may be used in order to create an amount of torque in order to rotate first bracket 102 (illustrated in FIG. 1C) than is used in order to rotate first bracket 102 (illustrated in FIG. 1A).

In some examples, the greater torque force illustrated in FIG. 1C can resist a display of a computing device from rotating when a user touches the display. For example, to the greater torque force may prevent damage or unwanted movement when a user is applying input through touch. Resisting the rotation of the display by apparatus 100 can allow for the display to remain at a particular angle while inputs are being provided to the display via a physical touch.

Figure 2:
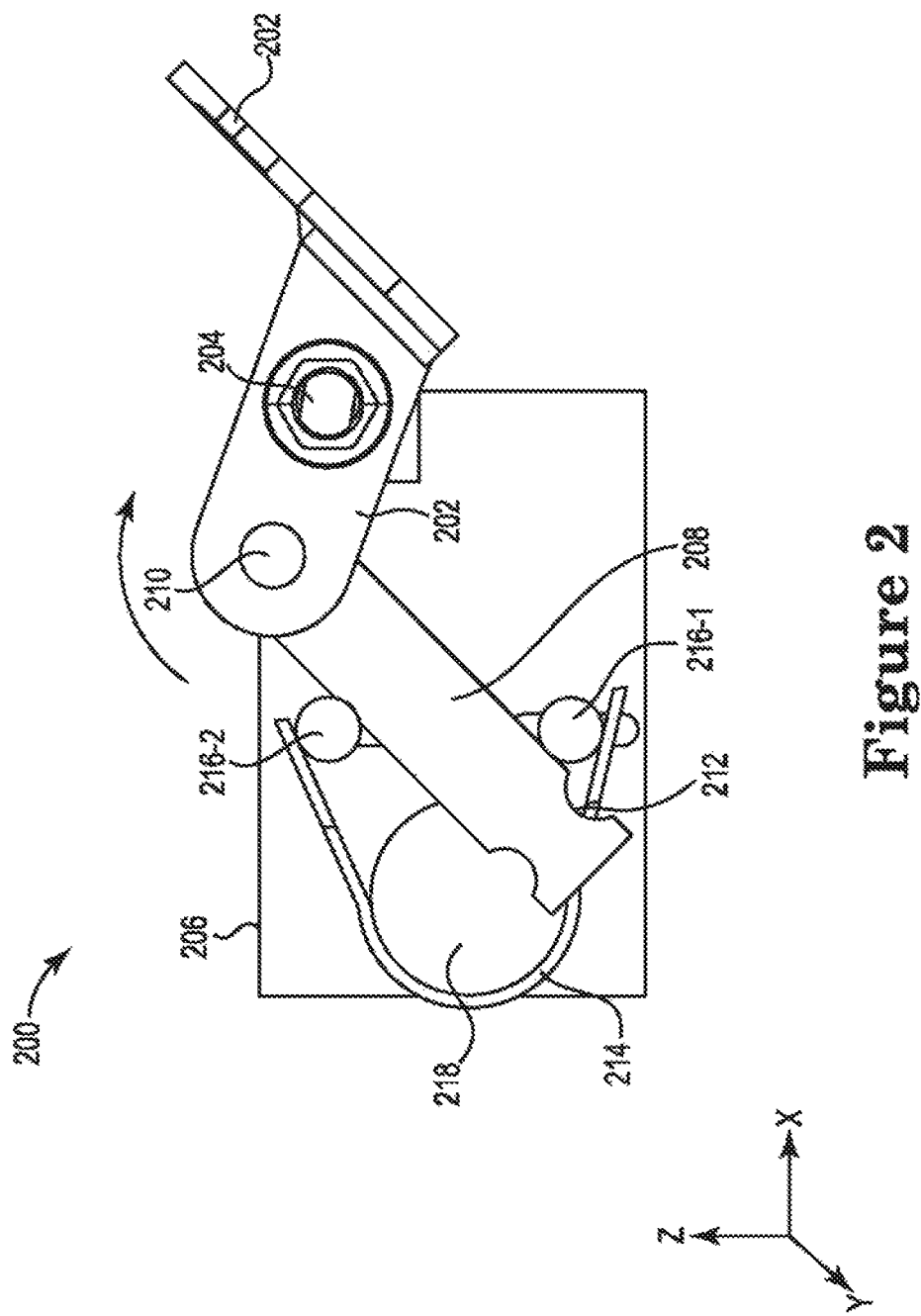
FIG. 2 illustrates yet another side view of an example of an apparatus consistent with the disclosure.

FIG. 2 illustrates yet another side view of an example of an apparatus consistent with the disclosure. The apparatus 200 can include first bracket 202, first shaft 204, second bracket 206, second shaft 210, variable torque bar 208, and the tensioner mechanism 214.

As illustrated in FIG. 2, the apparatus 200 can be oriented in an x-y-z-coordinate plane. For example, the x-coordinate as shown in FIG. 2 can be a length, the y-coordinate can be a width, and the z-coordinate can be a height. As indicated by the coordinate system shown in FIG. 2, a positive x-direction can refer to a direction toward the right of the page, a positive z-direction can refer to a direction toward the top of the page, and a positive y-direction can refer to a direction out of the page. A negative x-direction can refer to a direction toward the left of the page, a negative z-direction can refer to a direction toward the bottom of the page, and negative y-direction can refer to a direction into the page.

As illustrated in FIG. 2, apparatus 200 illustrates an apparatus such as a hinge at an angle of rotation. The apparatus 200 can rotate about first shaft 204 in a clockwise direction as indicated in FIG. 2 from the first angle of rotation described above in conjunction with FIG. 1A to the second angle of rotation described above in conjunction with FIG. 1B, to the third angle of rotation as described above in conjunction FIG. 1C.

The apparatus 200 can include a variable torque bar 208 attached to first bracket 202 via a second shaft 210. The variable torque bar 208 may include notch 212. While FIG. 2 is illustrated having one notch 212, it should be understood that variable torque bar 208 may have additional notches or utilize a design without notches. For example, apparatus 200 may include a variable torque bar 208 that utilizes different shapes and diameters, and/or contact pressure and/or friction to alter an amount of torque.

In this example, illustrated in FIG. 2, tensioner mechanism 214 is a spring that operates by torsion and/or twisting of a coil about the y-plane of protrusion 218 that is substantially the same as the second longitudinal axis of second shaft 210. The term "protrusion" as used herein could be a bolt, a pin, or any other portion of the apparatus and/or an attachment to the apparatus suitable for the anchoring of a structural piece or mechanism. For example, tensioner mechanism 214. In the example illustrated in FIG. 2, the coil portion of tensioner mechanism 214 is illustrated as in a substantially circular arrangement around protrusion 218. The circular arrangement is not to be taken in a limiting sense as the coil illustrated in FIG. 200 may also be of a different configuration, e.g. helical. In this example, tensioner mechanism 214 may have a pair of torque engaged pins 216-1, 216-2 that cause twisting/torsion of the coil as the pair of torque engaged pins 216-1, 216-2 are separated from one another. Said differently, as the pair of torque engaged pins 216-1, 216-2 of tensioner mechanism 214 are forced away from each other the coil opposite the pair of torque engaged pins 216-1, 216-2 twists thereby applying increased force in the form of torque to the variable torque bar 208, and the first bracket 202.

The pair of torque engaged pins 216-1, 216-2 may substantially correspond to notch 212, thereby releasing the pressure/resistance experienced by the tensioner mechanism 214 by way of allowing pair of torque engaged pins 216-1, 216-2 to move closer to one another when located at a notch 212. For example, variable torque bar 208 may move in a substantially negative x-direction in response to an alteration of an angle between the first bracket 202 and the second bracket 206; as variable torque bar 208 moves in the negative x-direction, tensioner mechanism 214 experiences tension in the form of torque about its coil in response to the pair of torque engaged pins 216-1, 216-2 separating from one another to accommodate the movement of the variable torque bar 208.

FIG. 2 illustrates the pair of torque engaged pins 216-1, 216-2 substantially moving in a negative z-direction and positive z-direction. As discussed above in the discussion of FIGS. 1A, 1B, and 1C, as the angle between second bracket 206 and first bracket 202 increases, the pair of torque engaged pins 216-1, 216-2 are forced further away from each other in response to second shaft 210 moving in a substantially positive z-direction. Said differently, as the angle between second bracket 206 and first bracket 202 increases, torque engaged pin 216-1 moves in a substantially negative z-direction and torque engaged pin 216-2 moves in a substantially positive z-direction. As the angle described above becomes larger, the torque force is larger. Further, as the angle described above becomes smaller the torque force is smaller. In some examples, this may allow for easier operability by a user.

Figure 3:
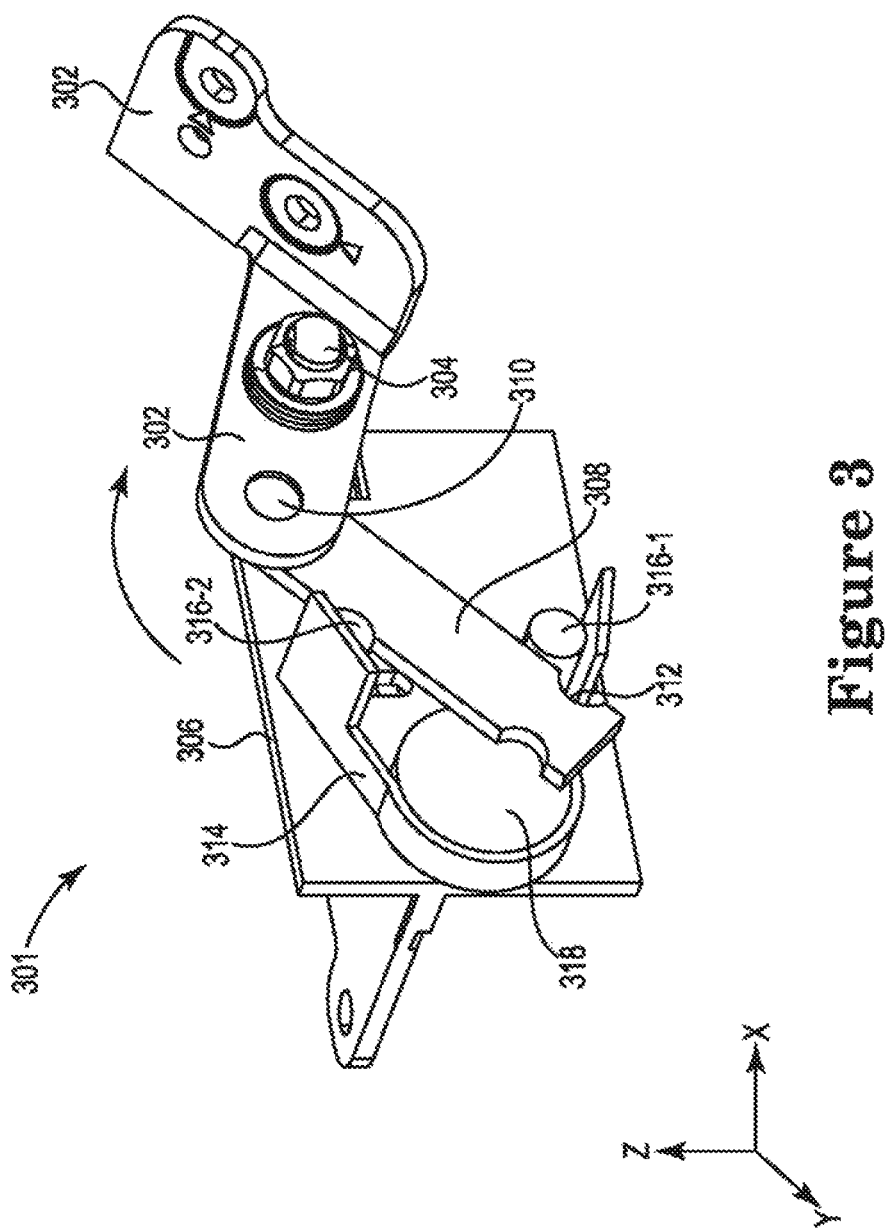
FIG. 3 illustrates a perspective view of an example of an apparatus consistent with the disclosure.

FIG. 3 illustrates a perspective view of an example of an apparatus consistent with the disclosure. The apparatus 301 can include first bracket 302, first shaft 304, second bracket 306, second shaft 310, variable torque bar 308, and tensioner mechanism 314.

As illustrated in FIG. 3, the apparatus 301 can be oriented in an x-y-z-coordinate plane. For example, the x-coordinate as shown in FIG. 3 can be a length, the y-coordinate can be a width, and the z-coordinate can be a height. As indicated by the coordinate system shown in FIG. 3, a positive x-direction can refer to a direction toward the right of the page, a positive z-direction can refer to a direction toward the top of the page, and a positive y-direction can refer to a direction out of the page. A negative x-direction can refer to a direction toward the left of the page, a negative z-direction can refer to a direction toward the bottom of the page, and negative y-direction can refer to a direction into the page.

As illustrated in FIG. 3, apparatus 301 illustrates an apparatus at an angle of rotation. The apparatus 301 can rotate about first shaft 304 in a clockwise direction as indicated in FIG. 3 from the first angle of rotation described above in conjunction with FIG. 1A to the second angle of rotation described above in conjunction with FIG. 1B, to the third angle of rotation as described above in conjunction FIG. 1C.

In the example illustrated in FIG. 3, the perspective view is shown as substantially three-dimensional for clarity. In the example illustrated in FIG. 3, tensioner mechanism 314 is a spring that operates by torsion and/or twisting of a coil about the y-plane of a protrusion 318 that is substantially the same as the second longitudinal axis of second shaft 310.

In this example illustrated in FIG. 3, tensioner mechanism 314 may have a pair of torque engaged pins 316-1, 316-2 that cause twisting/torsion of the coil as the pair of torque engaged pins 316-1, 316-2 are separated from one another. Said differently, as the pair of torque engaged pins 316-1, 316-2 of tensioner mechanism 314 are forced away from each other the coil opposite the pair of torque engaged pins 316-1, 316-2 experiences tension thereby applying increased torque force in the form of torque to the variable torque bar 308 and the first bracket 302. Said differently, as the angle between second bracket 306 and first bracket 302 increases, torque engaged pin 316-1 moves in a substantially negative z-direction and torque engaged pin 316-2 moves in a substantially positive z-direction.

FIG. 3 illustrates the pair of torque engaged pins 316-1, 316-2 substantially moving in a negative z-direction and positive z-direction. As discussed above in the discussion of FIGS. 1A, 1B, 1C, and 2 as the angle between second bracket 306 and first bracket 302 increases, the pair of torque engaged pins 316-1, 316-2 are forced further away from each other in response to second shaft 310 moving in a substantially positive z-direction. As the angle described above becomes larger, the torque force is larger. Further, as the angle described above becomes smaller the torque force is smaller. In some examples, this may allow for easier operability by a user.

For example, when first bracket 302 is connected to a display of a computing device such as a laptop, and second bracket 306 may be connected to a housing of the computing device, notch 312 corresponds to a first position at about a 0-degree angle when the display of the computing device is closed. As variable torque bar 308 moves to the second position or the third position as described above in FIGS. 1A, 1B, and 1C, the torque increases. However, the torque force from the first position to the second position is such that a user may open the computing device with ease. In some examples, the weaker torque force from the first position to the second position may permit the user to open computing device using one hand.

In another example, the greater torque force can resist a display of a computing device from rotating to an unwanted angle when a user touches the display. For example, to prevent damage or unwanted movement when a user is applying input through touch. Resisting the rotation of the display by the apparatus 301 can allow for the display to remain at a particular angle while inputs are being provided to the display via a physical touch.

Figure 4:
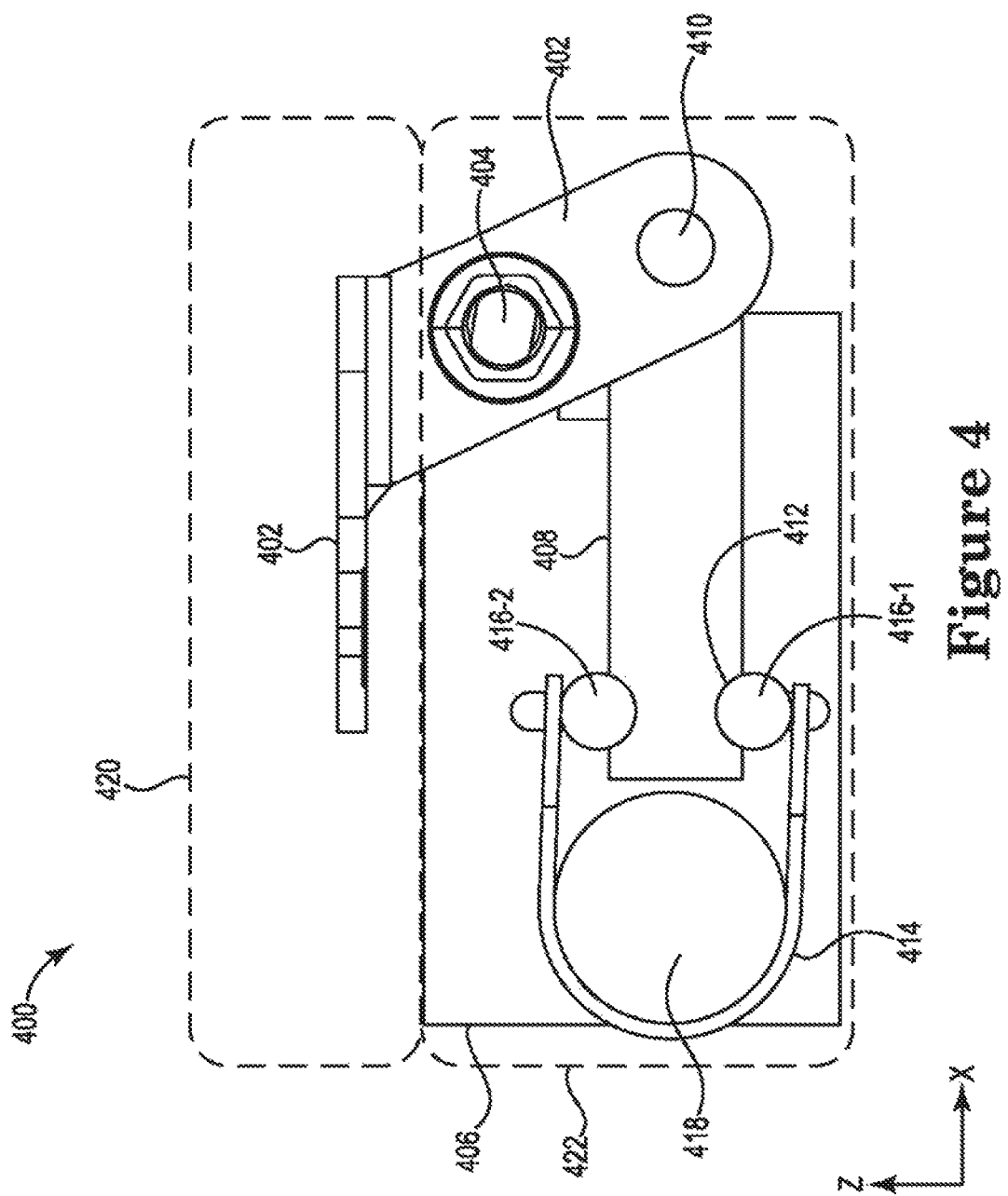
FIG. 4 illustrates a side view of an example of a system including a computing device consistent with the disclosure.

FIG. 4 illustrates a side view of an example of a system including a computing device consistent with this disclosure. The computing device can include a housing 422 and a rotating element 420.

As illustrated in FIG. 4, the computing device can be oriented in an x-z-coordinate plane. For example, the x-coordinate as shown in FIG. 4 can be a length, and the z-coordinate can be a height. As indicated by the coordinate system shown in FIG. 4, a positive x-direction can refer to a direction toward the right of the page, and a positive z-direction can refer to a direction toward the top of the page. A negative x-direction can refer to a direction toward the left of the page, and a negative z-direction can refer to a direction toward the bottom of the page.

The system 400 can include a computing device. The computing device can be, for example, a laptop computer, among other types of computing devices. The computing device can include a rotating element 420, a housing 422 of the computing device, and can include an apparatus connected to the computing device. The rotating element 420 can rotate relative to housing 422 of the computing device via the apparatus. For example, rotating element 420 can be rotated relative to housing 422 via the apparatus.

In some examples, rotating element 420 can be a display. For example, the display can provide and/or receive information to and/or from a user via a graphical user interface (GUI). In some examples, the display can be a touch screen display to provide and/or receive information from a user. The display can be rotated relative to the housing 422 via the apparatus.

FIG. 4 illustrates the pair of torque engaged pins 416-1, 416-2 substantially moving in a negative z-direction and positive z-direction. As discussed above in the discussion of FIGS. 1A, 1B, 1C, 2, and 3 as the angle between second bracket 406 and first bracket 402 increases as the pair of torque engaged pins 416-1, 416-2 move and are forced away from each other as second shaft 410 moves in a substantially positive z-direction. As the angle described above becomes larger, the torque force is larger. Further, as the angle described above becomes smaller the torque force is smaller. In some examples, this may allow for easier operability by a user as compared to some approaches.

For example, when the computing device of system 400 is a laptop, a user may open the laptop by gripping display 420 and rotating it about the first longitudinal axis of 404 while the housing 422 remains immobile. The torque force exerted on bracket 402 is when the angle between display 420 and housing 422 is about 0-degrees. In this example the user may be able to open the laptop display utilizing one hand. While this example utilizes a laptop, it should be understood that this is not a limiting example and other types of computing devices may be utilized.

In contrast, other approaches may utilize another hand or a device to hold the housing 422 immobile such that the display may be rotated about the first longitudinal axis of the first shaft 404.

In another example, as the housing 422 of the computing device remains immobile, the display 420 may be rotated about the first longitudinal axis of first shaft 404 torque increases. As torque increases as described in FIGS. 1A, 1B, 1C, 2 and 3 more touch force may be utilized from the user to rotate the display 420. In some examples this may prevent unwanted movement or damage to the computing device.

For example, some computing devices accept input from a user through physical touch. The increased torque as described above may prevent the unwanted movement of display 420 or damage to the computing device that may be caused by unintentionally increasing the angle between first bracket 402 and second bracket 406.

Although not shown in FIG. 4 for clarity and so as not to obscure examples of the disclosure, the computing device can include a second apparatus as described in this disclosure. The second apparatus can be located on an opposing side of the computing device. For example, the second apparatus can be oriented in a similar manner as the apparatus illustrated in FIG. 4, and be located on an opposing side of the computing device apparatus illustrated in FIG. 4.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The Figures herein follow a numbering convention in which the first digit corresponds to the drawing Figure number and the remaining digits identify an element or component in the drawing. For example, reference numeral 100 may refer to element 102 in FIG. 1A and FIG. 1B and an analogous element may be identified by reference numeral 102 in FIG. 1C. Elements shown in the various Figures herein can be added, exchanged, and/or eliminated to provide additional examples of the disclosure. In addition, the proportion and the relative scale of the elements provided in the Figures are intended to illustrate the examples of the disclosure, and should not be taken in a limiting sense The above specification, examples and data provide a description of the use of the system and method of the disclosure. Since many examples can be made without departing from the spirit and scope of the system and method of the disclosure, this specification merely sets forth some of the many possible examples and implementations.

What is claimed is:

1. An apparatus, comprising:
a first bracket connected to a first shaft, the first shaft to rotate about a first longitudinal axis;
a second bracket connected to the first bracket; and
a variable torque bar connected to the first bracket and to a second shaft, the second shaft to rotate about a second longitudinal axis, wherein the variable torque bar includes a plurality of notches to engage a tensioner mechanism, and wherein the variable torque bar is to alter an amount of torque applied to the first shaft when the tensioner mechanism engages respective notches among the plurality of notches.

2. The apparatus of claim 1, wherein a first notch of the plurality of notches engages the tensioner mechanism in a first position when the first bracket and the second bracket are at a first angle; and a second notch of the plurality of notches engages the tensioner mechanism in to a second position at a second angle when the first bracket and the second bracket rotate about the first longitudinal axis of the first shaft, wherein the variable torque bar moves substantially orthogonal to the first longitudinal axis in response to the alteration from the first position to the second position.

3. The apparatus of claim 2, wherein the movement of the first bracket from the first position to the second position causes the tensioner mechanism to engage a particular notch among the plurality of notches of the variable torque bar rotating the second shaft about the second longitudinal axis.

4. The apparatus of claim 2, wherein the second bracket is connected to a housing of a computing device; and the first bracket is connected to a display of the computing device to rotate relative to the housing of the computing device in response to the first bracket and the first shaft rotating about the first longitudinal axis of the first shaft from the first angle to the second angle.

5. Then apparatus of claim 4, wherein the first angle and the second angle correspond to the tensioner mechanism engaging at least one notch among the plurality of notches of the variable torque bar at increasing torque force.

6. The apparatus of claim 1, wherein a third notch of the plurality of notches engages the tensioner mechanism in to a third position at a third angle when the first bracket and the second bracket rotate about the first longitudinal axis of the first shaft, wherein the variable torque bar moves substantially orthogonal to the first longitudinal axis in response to the alteration from the first position to the second position.

7. The apparatus of claim 1, wherein the variable torque bar alters an amount of torque applied to the first shaft as the tensioner mechanism engages the respective notches of the plurality of notches.

8. The apparatus of claim 1, wherein the first bracket and the first shaft rotate relative to the second bracket about the first longitudinal axis of the first shaft.

9. An apparatus, comprising:
a first bracket connected to a first shaft to rotate about a first longitudinal axis;
a second bracket connected to the first bracket; and
a variable torque bar connected to the first bracket and to a second shaft, the second shaft to rotate about a second longitudinal axis, wherein the variable torque bar includes a plurality of notches to engage a tensioner mechanism, wherein the variable torque bar provides altered torque in response to movement of the first bracket from a first position to a second position, wherein the torque is altered until the first bracket reaches a threshold angle relative to the second bracket.

10. The apparatus of claim 9, wherein the threshold value corresponds to at least one of the plurality of notches of the variable torque bar.

11. The apparatus of claim 9, wherein the plurality of notches corresponds to variable angles between the first bracket and the second bracket.

12. The apparatus of claim 11, wherein the variable angles are that of 0-degrees, 90-degrees, and 135-degrees.

13. The apparatus of claim 12, wherein the torque force provided by the variable arm prevents the variable angle from increasing substantially beyond 135-degrees.

14. A system, comprising:
a computing device including:
 a first bracket connected to a first shaft to rotate about a first axis, the first bracket attached to a display of the computing device;
 a second bracket connected to the first bracket, the second bracket connected to a housing of the computing device; and
 a variable torque bar connected the first bracket and a second shaft to rotate about a second longitudinal axis, wherein the variable torque bar comprises a plurality of notches to engage a tensioner mechanism in a first position where the first bracket attached to the display and the second bracket attached to the housing are at a first angle and rotate about the first longitudinal axis of the first shaft to a second position at a second angle, wherein the variable torque bar provides increased torque in response to movement of the first bracket from the first position to the second position, wherein the torque increases until the first bracket reaches a threshold angle relative to the second bracket.

15. The system of claim 14, wherein the variable torque bar provides a greater torque force in response to moving the display from the second position to a third position, than from the first position to the second position.

* * * * *